(12) United States Patent
Wetterwald et al.

(10) Patent No.: US 10,320,659 B2
(45) Date of Patent: Jun. 11, 2019

(54) SOURCE ROUTED DETERMINISTIC PACKET IN A DETERMINISTIC DATA NETWORK

(71) Applicant: Cisco Technology, Inc., San Jose, CA (US)

(72) Inventors: Patrick Wetterwald, Mouans Sartoux (FR); Pascal Thubert, La Colle sur Loup (FR); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 59 days.

(21) Appl. No.: 15/361,563

(22) Filed: Nov. 28, 2016

(65) Prior Publication Data

US 2018/0152377 A1 May 31, 2018

(51) Int. Cl.
*H04L 12/721* (2013.01)
*H04W 40/04* (2009.01)

(52) U.S. Cl.
CPC ............. *H04L 45/34* (2013.01); *H04W 40/04* (2013.01)

(58) Field of Classification Search
CPC .......... H04L 45/74; H04L 45/20; H04L 47/28
USPC ........................................................ 370/392
See application file for complete search history.

(56) References Cited

U.S. PATENT DOCUMENTS

| | | | |
|---|---|---|---|
| 7,668,119 B2 | 2/2010 | Thubert et al. | |
| 8,396,022 B1 * | 3/2013 | Lindsay | H04L 45/34 |
| | | | 370/321 |
| 8,542,610 B2 * | 9/2013 | Shatil | H04W 52/0216 |
| | | | 370/252 |
| 9,112,805 B2 | 8/2015 | Hui et al. | |
| 9,258,097 B2 | 2/2016 | Wetterwald et al. | |
| 9,485,174 B2 | 11/2016 | Hui et al. | |
| 9,992,703 B2 | 6/2018 | Wetterwald et al. | |
| 10,009,793 B2 | 6/2018 | Wetterwald et al. | |
| 10,080,224 B2 | 9/2018 | Thubert et al. | |

(Continued)

OTHER PUBLICATIONS

Kiran et al., "A Multi-Agent Reinforcement Learning Approach to Path Selection in Optical Burst Switching Networks", [online], Jun. 14-18, 2009 ICC '09 IEEE Conference on Communications, [retrieved on Oct. 25, 2016]. Retrieved from the Internet: URL: <http://ieeexplore.ieee.org/document/5198632/?section=abstract>, pp. 1-3.

(Continued)

*Primary Examiner* — Chi Tang P Cheng
(74) *Attorney, Agent, or Firm* — Leon R. Turkevich

(57) ABSTRACT

In one embodiment, a method comprises receiving, by a network device in a deterministic data network, one or more deterministic schedules for reaching a destination network device along one or more deterministic paths in the deterministic data network; generating, by the network device, a deterministic source-route path for reaching the destination network device based on the deterministic schedules allocated for the deterministic paths, the deterministic source-route path comprising, for each specified hop, a corresponding deterministic start time; and outputting, by the network device, a source routed deterministic packet comprising the deterministic source-route path for deterministic forwarding of the source routed deterministic packet to the destination network device.

20 Claims, 5 Drawing Sheets

(56) References Cited

U.S. PATENT DOCUMENTS

| | | | |
|---|---|---|---|
| 2004/0258066 A1* | 12/2004 | Chen | H04L 12/1877 370/390 |
| 2011/0292949 A1* | 12/2011 | Hayashi | H04L 12/5695 370/419 |
| 2015/0023325 A1* | 1/2015 | Wetterwald | H04L 5/0055 370/336 |
| 2017/0353292 A1 | 12/2017 | Thubert et al. | |

OTHER PUBLICATIONS

Thubert, Ed., "An Architecture for IPv6 over the TSCH mode of IEEE 802.15.4", [online], Jun. 10, 2016, [retrieved on Nov. 16, 2016]. Retrieved from the Internet: URL: https://tools.ietf.org/pdf/draft-ietf-6tisch-architecture-10.pdf>, pp. 1-49.

Winter, Ed., et al., "RPL: IPv6 Routing Protocol for Low-Power and Lossy Networks", Internet Engineering Task Force, Request for Comments: 6550, Mar. 2012, pp. 1-157.

Hui et al., "An IPv6 Routing Header for Source Routes with the Routing Protocol for Low-Power and Lossy Networks (RPL)", Internet Engineering Task Force, Request for Comments: 6554, Mar. 2012, pp. 1-13.

Watteyne, Ed., et al., "Using IEEE 802.15.4e Time-Slotted Channel Hopping (TSCH) in the Internet of Things (IoT): Problem Statement", Internet Engineering Task Force, Request for Comments: 7554, May 2015, pp. 1-23.

Andrews et al., "Source Routing and Scheduling in Packet Networks", Journal of the ACM, vol. 52, No. 4, Jul. 2005, pp. 582-601.

TTTech White Paper, "Time-Triggered Ethernet—A Powerful Network Solution for Multiple Purpose", TTTech Computertechnik AG, [online], [retrieved on Feb. 11, 2016]. Retrieved from the Internet: <URL: https://www.tttech.com/download/technologies/deterministic-ethernet/time-triggered-ethernet/?file=%2Ffileadmin%2Fcontent%2Fgeneral%2Fsecure%2FTTEthernet%2FTTTech_TTEthernet_Technical-Whitepaper>, pp. 1-14.

Wikipedia, "Precision Time Protocol", [online], Mar. 15, 2016, [retrieved on Mar. 18, 2016]. Retrieved from the Internet: URL: <https://en.wikipedia.org/w/index.php?title=Precision_Time_Protocol&printable=yes>, pp. 1-8.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Vasseur, "Terms Used in Routing for Low-Power and Lossy Networks", Internet Engineering Task Force, Request for Comments: 7102, Jan. 2014, pp. 1-8.

Herding Cats, "Deterministic Versus Probabilistic", [online], May 16, 2011, [retrieved on Jan. 15, 2019]. Retrieved from the Internet: URL: <https://herdingcats.typepad.com/my_weblog/2011/05/deterministic-versus-probabilistic.html>, pp. 1-3.

\* cited by examiner

SOURCE ROUTED DETERMINISTIC PACKET IN A DETERMINISTIC DATA NETWORK

TECHNICAL FIELD

The present disclosure generally relates to generation and transmission of a source routed deterministic packet in a deterministic data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Industrial networking requires predictable and reliable communications between devices. Deterministic networking (DetNet) refers to networks that can guarantee the delivery of packets within a bounded time. The Internet Engineering Task Force (IETF) is attempting to propose standards that can be applied to wireless devices for the stringent requirements of deterministic networks (e.g., minimal jitter, low latency, minimal packet loss). The IETF has proposed a routing protocol ("6TiSCH") that provides IPv6 routing using time slotted channel hopping (TSCH) based on IEEE 802.15.4e for higher reliability.

The 6TiSCH architecture specifies a Channel distribution/usage (CDU) matrix of "cells", each cell representing a unique wireless channel at a unique timeslot. The 6TiSCH architecture also specifies that a centralized Path Computation Element (PCE) determines and installs a track comprising a sequence of cells for each hop along a path from a source to a destination, for deterministic forwarding of a data packet. However, the required programming by the PCE of both the routes and the schedule inside each hop along the deterministic path results in minimal flexibility in terms of forwarding packets; moreover, there has been no known technique to readily determine the deterministic performance along the deterministic path.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
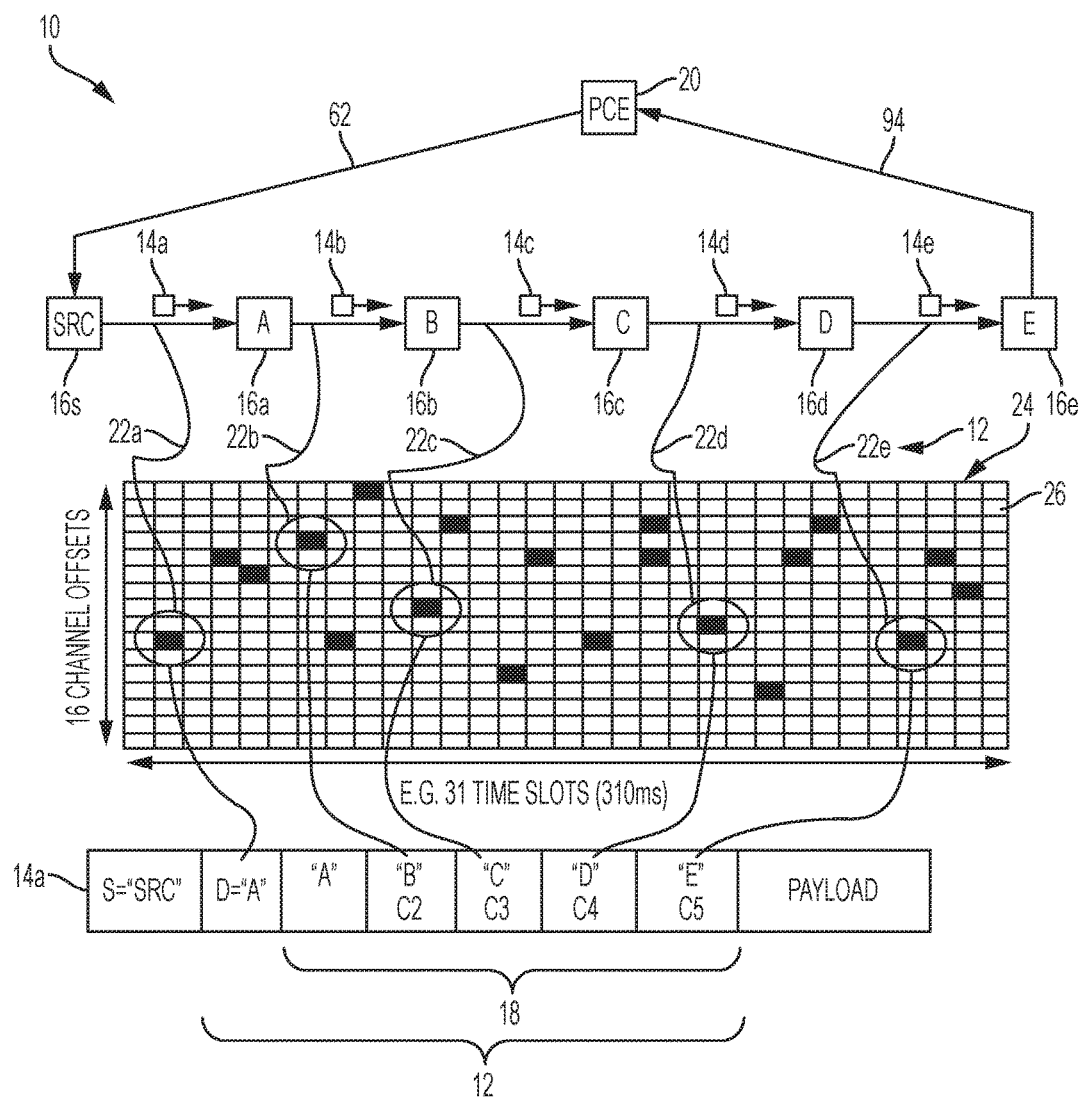
FIG. 1 illustrates an example deterministic data network having network devices for deterministic forwarding of a source routed deterministic packet comprising a deterministic source-route path between a source network device and a destination network device in a deterministic data network, according to an example embodiment.

In one embodiment, a method comprises receiving, by a network device in a deterministic data network, one or more deterministic schedules for reaching a destination network device along one or more deterministic paths in the deterministic data network; generating, by the network device, a deterministic source-route path for reaching the destination network device based on the deterministic schedules allocated for the deterministic paths, the deterministic source-route path comprising, for each specified hop, a corresponding deterministic start time; and outputting, by the network device, a source routed deterministic packet comprising the deterministic source-route path for deterministic forwarding of the source routed deterministic packet to the destination network device.

In another embodiment, a method comprises deterministically receiving, by a network device in a deterministic data network, a source routed deterministic packet comprising a deterministic source-route path for reaching a destination network device in the deterministic data network, the deterministic source-route path comprising, for each specified unused hop, a corresponding deterministic start time; and deterministically forwarding, by the network device, the source routed deterministic packet at the corresponding deterministic start time specified for the network device.

In another embodiment, an apparatus comprises a device interface circuit and a processor circuit. The device interface circuit is configured for receiving, in a deterministic data network, one or more deterministic schedules for reaching a destination network device along one or more deterministic paths in the deterministic data network. The processor circuit is configured for generating a deterministic source-route path for reaching the destination network device based on the deterministic schedules allocated for the deterministic paths. The deterministic source-route path comprises, for each specified hop, a corresponding deterministic start time. The processor circuit further is configured for causing the device interface circuit to output a source routed deterministic packet comprising the deterministic source-route path for deterministic forwarding of the source routed deterministic packet to the destination network device.

In another embodiment, an apparatus comprises a device interface circuit and a processor circuit. The device interface circuit is configured for deterministically receiving, in a deterministic data network, a source routed deterministic packet comprising a deterministic source-route path for reaching a destination network device in the deterministic data network. The deterministic source-route path comprises, for each specified unused hop, a corresponding deterministic start time. The processor circuit is configured for causing the device interface circuit to deterministically forward the source routed deterministic packet at the corresponding deterministic start time specified for the apparatus.

In another embodiment, one or more non-transitory tangible media encoded with logic for execution by a machine and when executed by the machine operable for: receiving, by the machine implemented as a network device in a deterministic data network, one or more deterministic schedules for reaching a destination network device along one or more deterministic paths in the deterministic data network;

generating, by the network device, a deterministic source-route path for reaching the destination network device based on the deterministic schedules allocated for the deterministic paths, the deterministic source-route path comprising, for each specified hop, a corresponding deterministic start time; and outputting, by the network device, a source routed deterministic packet comprising the deterministic source-route path for deterministic forwarding of the source routed deterministic packet to the destination network device.

In another embodiment, one or more non-transitory tangible media encoded with logic for execution by a machine and when executed by the machine operable for: deterministically receiving, by the machine implemented as a network device in a deterministic data network, a source routed deterministic packet comprising a deterministic source-route path for reaching a destination network device in the deterministic data network, the deterministic source-route path comprising, for each specified unused hop, a corresponding deterministic start time; and deterministically forwarding, by the network device, the source routed deterministic packet at the corresponding deterministic start time specified for the network device.

DETAILED DESCRIPTION

Particular embodiments enable deterministic forwarding of a data packet to a destination network device in a deterministic data network along a deterministic path, without the necessity of executing any prior programming of any deterministic start times in any intermediate network devices along the deterministic path. The deterministic forwarding of a data packet can be executed by a source network device, on an ad hoc basis, based on the source network device inserting into the data packet a deterministic source-route path specifying for each hop a corresponding deterministic start time for initiating transmission of the data packet (e.g., a source-route header can specify each next-hop network device and the corresponding deterministic start time). The deterministic source-route path is based on the network device receiving one or more deterministic schedules for reaching the network device along one or more deterministic paths.

Hence, a source network device can execute deterministic forwarding of a data packet, on an ad hoc basis, based on selecting one of the unallocated deterministic schedules having been received, for example, from a centralized management entity such as a path computation element. The centralized management entity can maintain an inventory of all deterministic schedules having been allocated deterministic start times in the deterministic data network, and can establish the new deterministic schedules from unallocated start times in the deterministic data network. Hence, deterministic forwarding can be executed by the source network device for any arbitrary data packet, for example a deterministic "ping" message, a deterministic Operations, Administration and Management (OAM) message, an arbitrary sensor message, an alarm message, etc., without prior installation of transmission schedules in intermediate network devices along the path between the source network device and the destination network device.

Further, the source routed deterministic packet enables an intermediate network device to deterministically forward the source routed deterministic packet in response to detecting the corresponding deterministic start time specified in the deterministic source-route path; the intermediate network device also can detect a timing difference between an actual time value of receiving the source routed deterministic packet relative to a corresponding start time specified for reception by the intermediate network device (i.e., the transmit start time specified for the transmitting network device transmitting the source routed deterministic packet to the intermediate network device). Consequently, the source routed deterministic packet can collect the timing differences (i.e., timing errors) encountered along each hop as the source routed deterministic packet is forwarded along the deterministic source-route path to the destination device, enabling the destination device to forward the collected timing errors encountered along each hop to the centralized management entity for analysis and corrective action.

Figure 2:
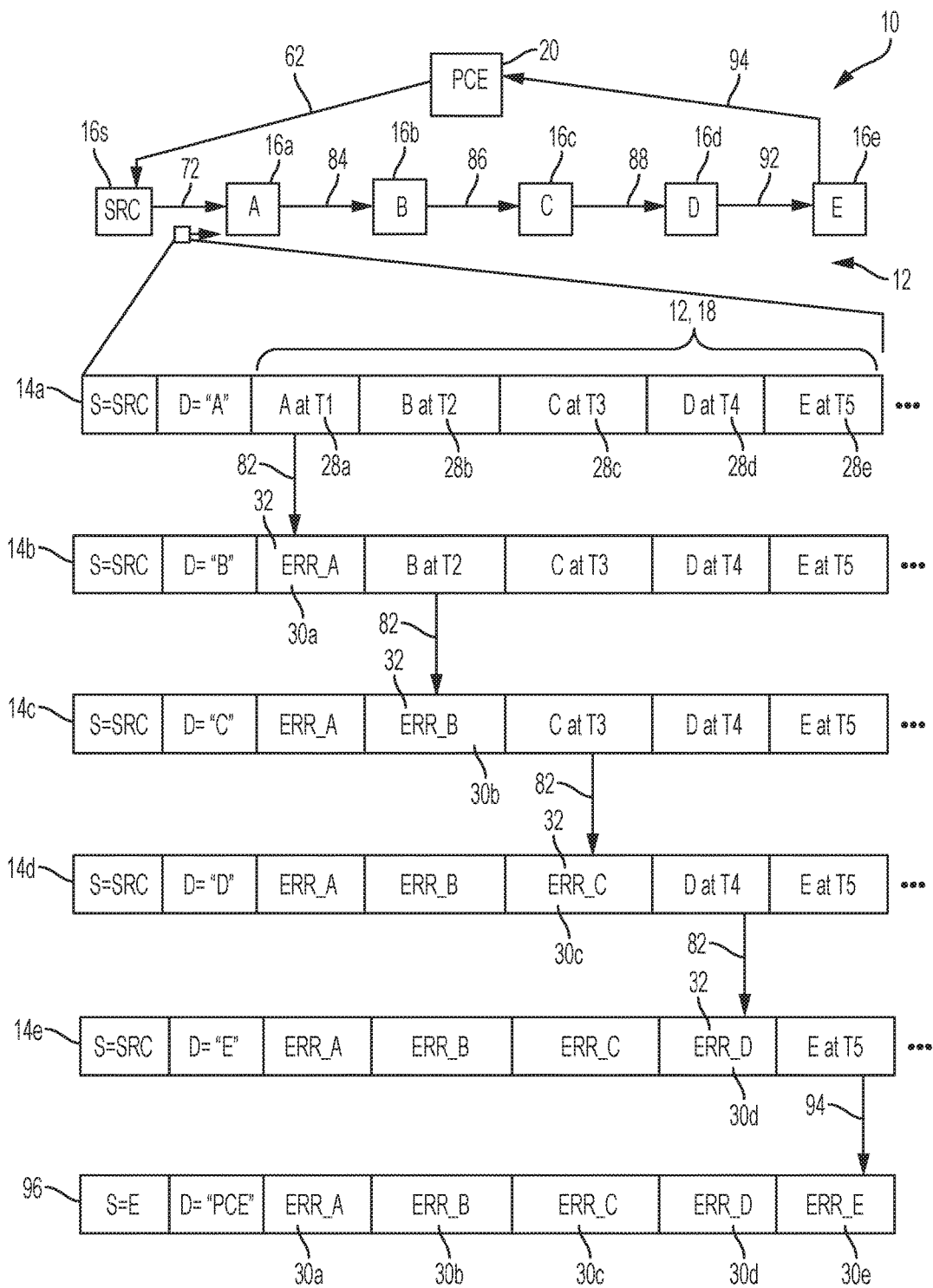
FIG. 2 illustrates another example deterministic data network having network devices for deterministic forwarding of a source routed deterministic packet comprising a deterministic source-route path between a source network device and a destination network device in a deterministic data network, according to an example embodiment.

FIGS. 1 and 2 illustrate an example deterministic data network 10 providing a deterministic source-route path 12 for deterministic forwarding of a deterministic data packet 14 (e.g., 14a, 14b, 14c, 14d, and/or 14e) by network devices 16 (e.g., 16s, 16a, 16b, 16c, 16d) to a destination network device 16e, based on the source routed deterministic data packet 14 specifying the deterministic source-route path 12 (e.g., at least partially within a deterministic source-route header 18), according to an example embodiment. The deterministic source-route path 12 can be selected by a source network device 16s based on the source network device 16s having received one or more deterministic paths in the deterministic data network 10 from a centralized management entity 20, for example a PCE.

The PCE 20 can be configured for determining one or more deterministic schedules for one or more hop-by-hop deterministic source-route paths 12, where each deterministic schedule specifies for each hop a corresponding start time, each start time implemented for example as an identified time slot in a time-slotted deterministic network or a time-triggered start time in a time-triggered transmission network.

As illustrated in FIG. 1, the deterministic schedule can be implemented as comprising a sequence of 6TiSCH "cells" "C1" 22a, "C2" 22b, "C3" 22c, "C4" 22d, and "C5" 22e. The 6TiSCH cells 22a-22e can be allocated by the PCE 20 from a CDU matrix 24 having a plurality of cells 26, each cell 26 representing a unique wired or wireless frequency channel at a unique timeslot. Hence, each allocated cell 22 corresponds to a unique cell 26. The CDU matrix 24 can be generated by the PCE 20 and/or another centralized management entity. The repeatable CDU matrix 24 is illustrated as encompassing sixteen (16) frequency channel offsets over thirty-one (31) 10 millisecond (ms) timeslots identified by timeslot offsets (e.g., an Absolute Slot Number (ASN)) relative to an epochal start of time, such that the CDU matrix 24 can have a total duration of 310 ms.

As illustrated in FIG. 1, the PCE 20 can generate the deterministic schedule, illustrated as the sequence of 6TiSCH cells 22a, 22b, 22c, 22d, and 22e, that are reserved by the PCE 20 for use by the hop-by-hop sequence of the respective network devices 16s, 16a, 16b, 16c, and 16d for transmission of a data packet 14. The term "allocated" has used herein refers to the PCE 20 reserving a cell 22 for a specific network device 16, but does not include the PCE 20 notifying or otherwise configuring the specific network device 16 for transmission at the time coinciding for the reserved cell; to the contrary, a specific network device can first learn of the allocated cell in response to detecting the allocated cell in a deterministic source-route header 18, described below.

As illustrated in FIG. 1, the allocated cell 22a is allocated for transmission by the source network device "SRC" 20s to the network device 16a; the allocated cell 22b is allocated for transmission by the network device 16a to the network device 16*b*; the allocated cell 22*c* is allocated for transmission by the network device 16*b* to the network device 16*c*; the allocated cell 22*d* is allocated for transmission by the network device 16*c* to the network device 16*d*; and the allocated cell 22*e* is allocated for transmission by the network device 16*d* to the network device 16*e*. Hence, each allocated cell 22 in FIG. 1 comprises an identified time slot in a time-slotted deterministic network operating according to the CDU matrix 24, and a corresponding frequency channel for transmission of the corresponding packet at the corresponding time slot according to the CDU matrix 24. In one embodiment, an allocated cell 22 also could be implemented as merely a "timeslot" for a fixed wireless channel, hence a given allocated cell 22 also can be referred to herein as a "deterministic transmit slot" (for use by a transmitting network device transmitting a data packet 14), a "deterministic receive slot" (for use by a receiving network device receiving a data packet 14), or more generally the allocated cell 22 can be referred to herein as a "deterministic slot".

Hence, the source network device "SRC" 16*s* can receive, from the PCE 20, one or more deterministic schedules (e.g., the sequence of 6TiSCH cells 22*a*, 22*b*, 22*c*, 22*d*, and 22*e*) that are identified as allocated for the hop-by-hop source route path of network devices "A" 16*a*, "B" 16*b*, "C" 16*c*, "D" 16*d*, and "E" 16*e*. Hence, the deterministic source-route path 12 is established based on allocating the deterministic schedule (e.g., the sequence of 6TiSCH cells 22*a*, 22*b*, 22*c*, 22*d*, and 22*e*) to the hop-by-hop source route path of network devices "A" 16*a*, "B" 16*b*, "C" 16*c*, "D" 16*d*, and "E" 16*e*. The one or more deterministic schedules received by the source network device "SRC" 16*s* can be distinct from allocated schedules previously assigned by the PCE 20 to the same or other network devices 16 for other data flows in the deterministic data network 10.

FIG. 2 illustrates that the deterministic start time for each next-hop device in the deterministic source-route path 12 can be implemented by the PCE 20 as a time-triggered start time 28 according a time-triggered deterministic transmission protocol (e.g., Time-Triggered Ethernet). As illustrated in FIG. 2, the source network device "SRC" 16*s* can be allocated the time-triggered start time "T1" 28*a* for transmission of the source routed deterministic data packet 14*a* to its next-hop device "A" 16*a*; the next-hop network device "A" 16*a* can be allocated the time-triggered start time "T2" 28*b* for transmission of the source routed deterministic data packet 14*b* to its next-hop device "B" 16*b* in response to reception of the source routed deterministic data packet 14*a*; the next-hop network device "B" 16*b* can be allocated the time-triggered start time "T3" 28*c* for transmission of the source routed deterministic data packet 14*c* to its next-hop network device "C" 16*c* in response to reception of the source routed deterministic data packet 14*b*; the next-hop network device "C" 16*c* can be allocated the time-triggered start time "T4" 28*d* for transmission of the source routed deterministic data packet 14*d* to its next-hop network device "D" 16*d* in response to reception of the source routed deterministic data packet 14*c*; the next-hop network device "D" 16*d* can be allocated the time-triggered start time "T5" 28*e* for transmission of the source routed deterministic data packet 14*e* to its next-hop destination network device "E" 16*e* in response to reception of the source routed deterministic data packet 14*d*.

Hence, the PCE 20 can allocate, to the source network device 16*s*, one or more deterministic schedules for reaching the destination network device 16*e* along one or more deterministic paths in the deterministic data network 10; the deterministic schedules received by the source network device 16*s* can serve as an "unallocated pool" of available deterministic paths that can be used by the source network device 16*s* on an ad hoc basis. Hence, the deterministic schedules received by the source network device 16*s* enable the source network device 16*s* to generate a deterministic source-route path 12 based on the deterministic schedules allocated by the PCE 20 for use by the source network device 16*s* in dynamically forwarding, as needed, a source routed deterministic data packet 14 along one or more of the deterministic paths.

Instances may arise in a data network (e.g., Time-Triggered Ethernet) where a data packet transmission is delayed, for example due to an existing transmission in a collision-avoidance based transmission protocol, for example CSMA-CA. As described in further detail below, each network device receiving a source routed deterministic data packet 14 can determine a timing difference between the deterministic start time (e.g., the timeslot for the allocated cell 22 or the time-triggered start time 28) and the actual time value that the source routed deterministic data packet 14 was received by the network device; the network device can insert the time difference (30 of FIG. 2) as an error value "ERR" into a corresponding slot 32 allocated for the network device 16 in the deterministic source-route header 18. Hence, the collection of the time differences (e.g., 30*a*, 30*b*, 30*c*, 30*d*) as a data packet (e.g., 14*e*) traverses the deterministic source-route path 12 enables the PCE 20 to determine the relative time variations between the prescribed deterministic schedules and the actual time values that the data packets were received.

Figure 3:
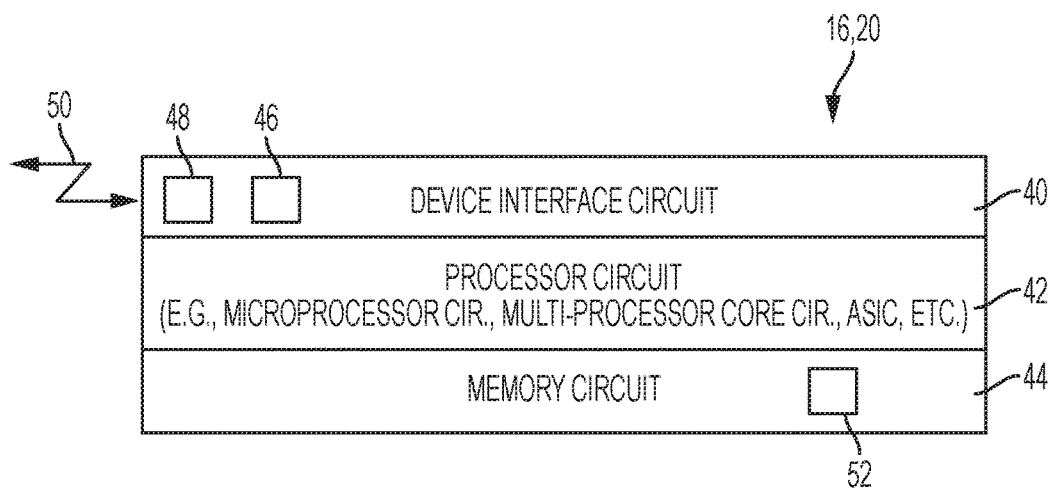
FIG. 3 illustrates an example implementation of any one of the network devices of FIGS. 1 and/or 2, according to an example embodiment.

FIG. 3 illustrates an example implementation of any one of the devices 16, 20 of FIG. 1 or 2, according to an example embodiment. Each device 16, 20 is a physical machine (i.e., a hardware device) configured for implementing network communications with other physical machines 16, 20 via the deterministic data network 10. The term "configured for" or "configured to" as used herein with respect to a specified operation refers to a device and/or machine that is physically constructed and arranged to perform the specified operation. Hence, the apparatus 16, 20 is a network-enabled machine implementing network communications via the network deterministic data network 10.

Each apparatus 16, 20 can include a device interface circuit 40, a processor circuit 42, and a memory circuit 44. The device interface circuit 40 can include a media access control (MAC) circuit 46 and one or more distinct physical layer transceiver (PHY) circuits 48 for communication with any one of the other devices 20 and/or 28; for example, MAC circuit 38 and/or the PHY circuit 40 of the device interface circuit 30 can be implemented as an IEEE based Ethernet transceiver (e.g., IEEE 802.1 TSN, IEEE 802.15.4e, IEEE 802.15.4u, DetNet, etc.) for communications with the devices of FIG. 1 or 2 via any type of data link 50, as appropriate (e.g., a wired or wireless link, an optical link, etc.).

The processor circuit 42 can be configured for executing any of the operations described herein, and the memory circuit 44 can be configured for storing any data or data packets as described herein, for example in a data structure 52.

Any of the disclosed circuits of the devices 16, 20 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4A:
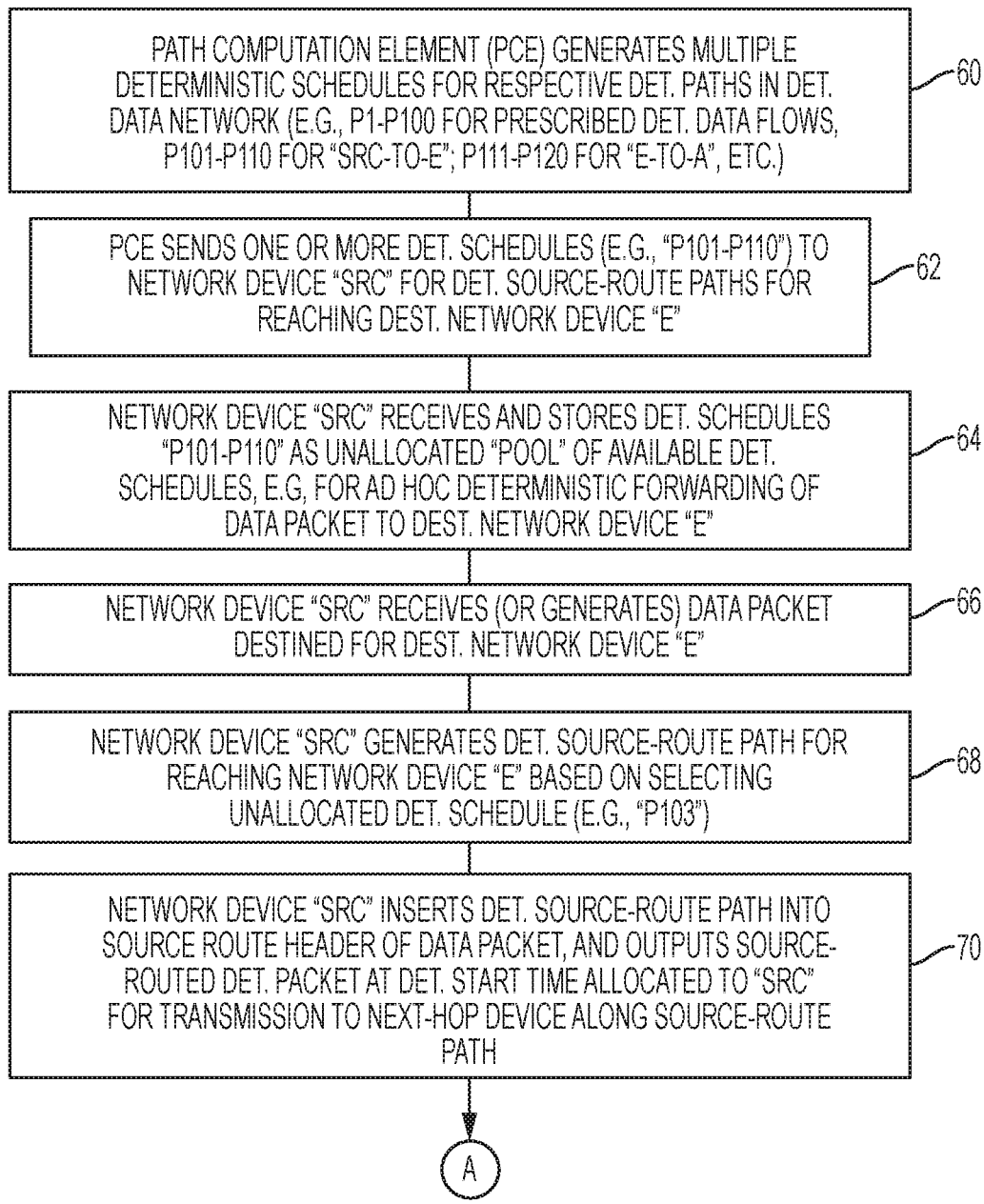
FIGS. 4A and 4B illustrate an example method of deterministic forwarding of a source routed deterministic packet comprising a deterministic source-route path between a source network device and a destination network device in a deterministic data network, according to an example embodiment.
Figure 4B:
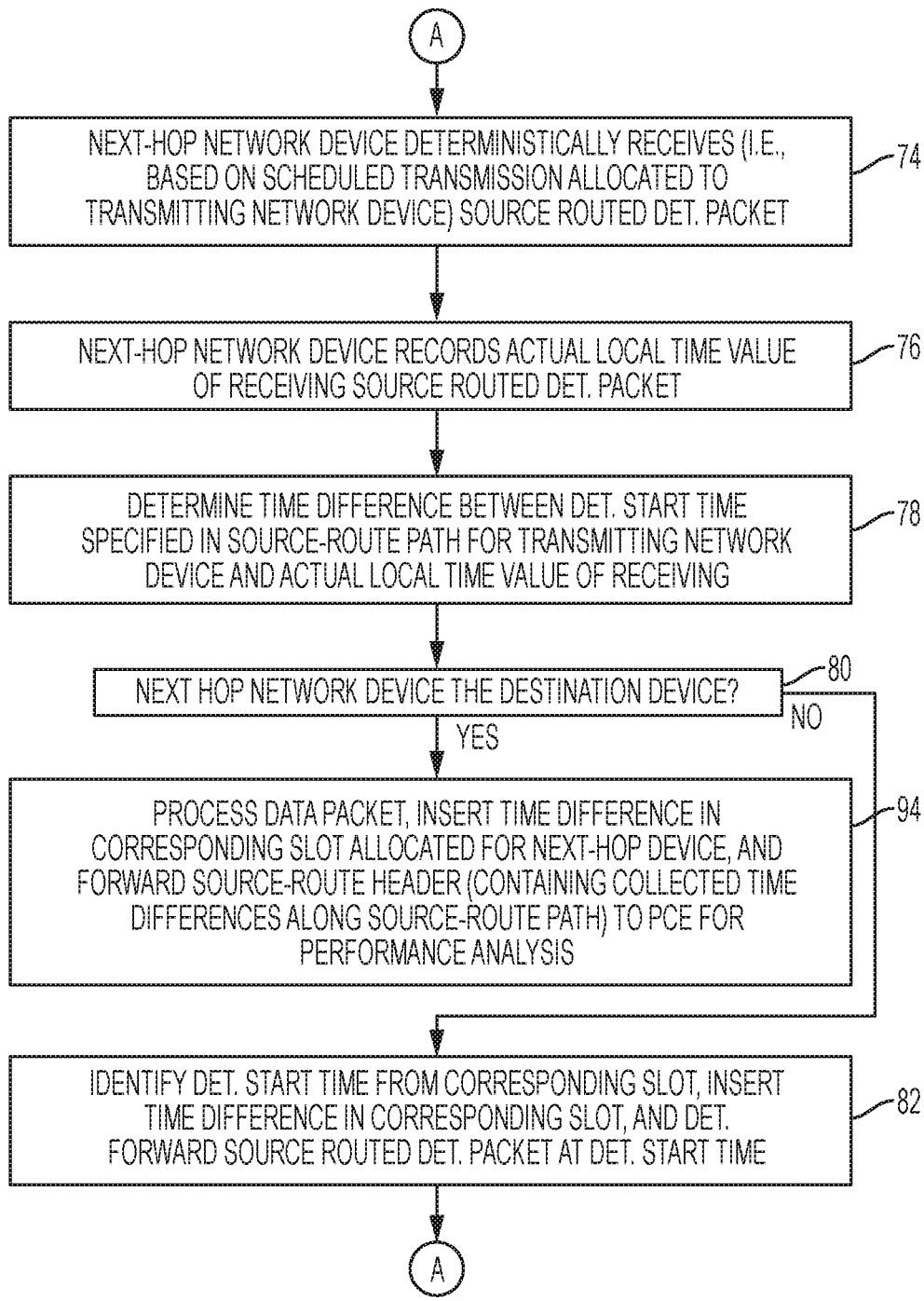

FIGS. 4A and 4B illustrate an example method of deterministic forwarding of a source routed deterministic packet 14, comprising a deterministic source-route path 12, between a source network device 16s and a destination network device 16e in a deterministic data network 10, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4A, the processor circuit 42 of the PCE 20 in operation 60 is configured for generating multiple deterministic schedules for respective deterministic paths within the deterministic data network 10, including prescribed data flows, prescribed network traffic (e.g., prescribed OAM frames at periodic intervals), etc. Hence, the PCE 20 can allocate a first group of deterministic schedules (e.g., "P1" through "P100") throughout the deterministic data network 10 for prescribed deterministic data flows using either the deterministic source routing as described herein, known programming of each and every hop for a deterministic flow, and/or a combination thereof.

The processor circuit 42 of the PCE 20 in operation 60 also can generate, for each network device 16, a second group of one or more non-interfering (i.e., non-overlapping) deterministic schedules for reaching a destination network device. For example, the PCE 20 can allocate the non-interfering deterministic schedules "P101" through "P110" for exclusive use only by the source network device "SRC" 16s for deterministic forwarding of data packets 14 to the destination network device "E" 16e along one or more deterministic paths 12. The PCE 20 also can allocate other distinct deterministic schedules (e.g., "P111" through "P120") for exclusive use only by the network device "E" 16e for deterministic forwarding of data packets 14 from network device "E" 16e to the network device "A" 16a, etc.

The processor circuit 42 of the PCE 20 in operation 62 can send in operation 62 the one or more deterministic schedules (e.g., "P101" through "P110") to the network device "SRC" 16s: the device interface circuit 40 of the network device "SRC" 16s in operation 64 receives the deterministic schedules (e.g., "P101" through "P110") that are reserved exclusively for the network device "SRC" 16s, and the processor circuit 42 of the network device "SRC" 16s stores the deterministic schedules (e.g., "P101" through "P110") in the memory circuit 44 as a data structure 52. In other words, the PCE 20 sends the deterministic schedules (e.g., "P101" through "P110") only to the network device "SRC" 16s and to no other network device in the deterministic data network 10.

The processor circuit 42 of the PCE 20 also can send, to each intermediate network device (e.g., 18a, 16b, 16c, 16d, and 16c) identified in each deterministic path sent to the source network device "SRC" 16s, a receive-only time interval that identifies to an intermediate network device a possible time (e.g., TSCH time slot as in FIG. 1 or a deterministic start time as in FIG. 2) that a data packet could be received from one or more transmitting network devices. Hence, the receive-only time interval supplied by the PCE does not indicate that an intermediate network device should process a data packet, or a time that should be use for deterministic transmission of a received data packet; rather, the receive-only time interval identifies a "monitoring interval" that should be used by the intermediate network device to determine whether a source-routed deterministic packet 14*a* is transmitted to the intermediate network device.

Hence, the PCE 20 can send instructions for receive-only time intervals to the intermediate network devices, and the source network device "SRC" 16*s* can send in a data packet 14*a* the deterministic start time for deterministic transmission by each hop along the deterministic path 12 to the destination network device 16*e*.

Hence, in response to receiving (or generating) a data packet in operation 66, the processor circuit 42 of the source network device "SRC" 16*s* in operation 68 can select one or more of the deterministic schedules stored in the data structure 52 as an "unallocated" schedule (e.g., "P103") from its "pool" of available schedules, and in response generate in operation 68 a deterministic source-route path 12. For example, the processor circuit 42 of the source network device "SRC" 16*s* may choose a high-priority, low latency schedule (e.g., "P103") for a high-priority packet requiring a guaranteed QoS, or a low-priority schedule (e.g., "P105") requiring minimal energy for a lower-priority packet. Hence, each deterministic schedule can be chosen on a per-packet basis, per-flow basis, etc. The source network device "SRC" 16*s* also can select a plurality of deterministic schedules for non-interfering transmissions of the data packet 14*a* along respective non-interfering deterministic paths generated by the PCE 20.

In another embodiment, the processor circuit 42 of the source network device "SRC" 16*s* also can be configured for generating its own deterministic path using deterministic schedules received from the PCE 20. In this example, the source network device "SRC" 16*s* can assemble at least a portion of the hop-by-hop deterministic path to the destination network device 16*e* based on received deterministic schedules (identifying when intermediate network devices are permitted to transmit), and assemble the deterministic path 12 accordingly. Hence, in contrast to receiving the hop-by-hop path and the associated deterministic schedule for use in transmitting along the hop-by-hop path, the source network device "SRC" 16*s* in this alternative embodiment can receive the deterministic schedule for intermediate network devices, and in response assemble the hop-by-hop path using the deterministic schedule.

The processor circuit 42 of the source network device "SRC" 16*s* can insert in operation 70 the deterministic source-route path 12 into the data packet, resulting in a source routed deterministic data packet 14*a* comprising a deterministic source-route header 18 for storing at least a portion of the deterministic source-route path 12. The source routed deterministic data packet 14*a* generated by the source network device "SRC" 16*s* in operation 70 can be implemented as illustrated in FIG. 1 or 2, depending on whether the deterministic data network 10 is implemented as a time-slotted deterministic network, a time-slotted and frequency-offset deterministic network (e.g., a 6TiSCH network as in FIG. 1), or a time-triggered network as in FIG. 2 that can utilize a time-triggered deterministic transmission protocol such as Time Triggered Ethernet. For example, the deterministic source-route header 18 in the example of the network of FIG. 1 can specify, for each next-hop, the corresponding IP address of the next-hop device, the corresponding timeslot offset (e.g., an ASN) and optionally the corresponding channel offset (illustrated in FIG. 1 as the cell "C2" comprising ASN and channel offset parameters for transmitting to network device 16*b*); as illustrated in FIG. 2, the deterministic source-route header 18 can specify, for each next-hop, in a time-triggered deterministic transmission network, the corresponding IP address of the next-hop device and the corresponding time-triggered start time (e.g., "T2" for transmitting to the network device 16*b*). The MAC circuit 46 also can set the next-hop destination MAC address prior to transmission.

As illustrated in FIGS. 1 and 2, the deterministic source-route path 12 in the source routed deterministic data packet 14*a* specifies, for each hop in the deterministic source route path, a corresponding deterministic start time reserved exclusively by the PCE 20 for deterministic transmission of the source routed deterministic data packet 14 to the corresponding next-hop network device. As described below, the corresponding slot also can be used by a network device to store a detected time difference 30; hence, the "extra" slot 30 for the first-hop network device "A" 16*a* is included to enable the first-hop network device "A" 16*a* to insert its corresponding time difference 30, described below. As apparent from the foregoing, the first slot reserved for the first-hop network device "A" 16*a* can be omitted if the recording of the time differences 30 is not needed, since the source network device "SRC" 16*s* would already know the corresponding deterministic start time (e.g., at cell 22*a* of FIG. 1 or time "T1" of FIG. 2).

The processor circuit 42 of the source network device "SRC" 16*s* in operation 70 causes the device interface circuit 40 to output the source routed deterministic data packet 14*a* at the allocated deterministic start time (e.g., 22*a* or 28*a*) to the next-hop network device "A" 16*a* in the deterministic source-route path 12, or at least as close as possible to the deterministic start time (e.g., 28*a*) if any other network devices are contending for access, described below.

As illustrated in FIG. 2, actual transmission of the source routed deterministic data packet 14*a* in operation 70 occurs at time "t_A" at event 72, where ideally the actual transmission of the source routed deterministic data packet 14*a* at time "t_A" equals the time-triggered start time "T1" 28*a*: instances may arise that the actual transmission time "t_A" at event 72 could be delayed, for example due to the source network device "SRC" 16*s* awaiting completion of an existing transmission by another network device in a collision-avoidance based transmission protocol, for example according to CSMA-CA. As described below, slots 32 of the deterministic source-route header 18 can be used to store a determined time difference 30 between the time triggered start time (e.g., "T1" 28*a*) and the actual transmission time (e.g., "t_A").

Referring to FIG. 4B, a network device 16 in the deterministic network 20 can be configured for activating its wired or wireless transceivers within its device interface circuit 40, in response to the receive-only time interval from the PCE 20, for a relatively short interval at the beginning of each deterministic start time to determine if a data packet 16 is being transmitted to the network device; for example, in the example of TSCH or 6TiSCH, a network device 16 can activate its device interface circuit 40 for about 1 millisecond (ms) (corresponding to a prescribed guard time for sync errors) at the beginning of each slot to determine whether a data packet is transmitted on the slot. Hence, the device interface circuit 40 of the next-hop network device "A" 16*a* can be configured for receiving in operation 74 the source routed deterministic data packet 14*a* at time "t_A" at event 72 from the source network device "SRC" 16*s*. The next-hop network device "A" 16*a* is configured for deterministically receiving the source routed deterministic data packet 14*a* based on the deterministic start time (e.g., 22*a* of FIG. 1 or "T1" 28*a* of FIG. 2). As described previously, only the source network device "SRC" 16*s* will have received the schedule allocated for the deterministic source-route path 12 for deterministic forwarding from the source network device "SRC" 16s to the destination network device "E" 16e.

The device interface circuit 40 of the next-hop network device "A" 16a in operation 76 can be configured for recording the actual local time value for receiving the source routed deterministic data packet 14a at event 72, namely the actual transmission time "t_A" by the source network device 16s. The processor circuit 42 of the next-hop network device "A" 16a in operation 78 can determine the timing difference "ERR_A" 30a between the corresponding deterministic start time "T1" 28a specified in the deterministic source-route path 12, and the actual time value "t_A" that the next-hop network device "A" 16a received the source routed deterministic data packet 14a (e.g., "ERR_A=T1−t_A").

In response to the processor circuit 42 of the next-hop network device "A" 16a determining from the deterministic source-route header 18 in operation 80 that it is not the destination device of the source routed deterministic data packet 14, the processor circuit 42 of the next-hop network device "A" 16a in operation 82 can identify from the deterministic source-route header 18 its corresponding next-hop network device "B" and its corresponding start time (e.g., 22b of FIG. 1, "T2" 28b of FIG. 2) from its corresponding slot 32 allocated to the next-hop network device "A" 16a.

The processor circuit 42 of the next-hop network device "A" 16a in operation 82 also can insert, into the initial slot 32, the timing difference "ERR_A" 28a prior to the deterministic forwarding of the source routed deterministic data packet 14b at the deterministic start time specified for the next-hop network device "A" 16a (e.g., 22b of FIG. 1 or "T2" 28b of FIG. 2).

The device interface circuit 40 of the next-hop network device "B" 16b is configured for deterministically receiving in operation 74 the source routed deterministic data packet 14b at time "t_B" at event 84, from the network device "A" 16a, based on the deterministic start time (e.g., 22b of FIG. 1 or "T2" 28b of FIG. 2). The device interface circuit 40 of the next-hop network device "B" 16b in operation 76 can record the actual local time value (e.g., t_B") for receiving the source routed deterministic data packet 14b at event 84. The processor circuit 42 of the next-hop network device "B" 16b in operation 78 can determine the timing difference "ERR_B" 28b between the corresponding deterministic start time "T2" 28b specified in the deterministic source-route path 12, and the actual time value "t_B" that the next-hop network device "B" 16b received the source routed deterministic data packet 14b (e.g., "ERR_B=T2−t_B").

In response to the processor circuit 42 of the next-hop network device "B" 16b determining from the deterministic source-route header 18 in operation 80 that it is not the destination device of the source routed deterministic data packet 14, the processor circuit 42 of the next-hop network device "B" 16b in operation 82 can identify its corresponding next-hop network device "C" and its corresponding start time (e.g., 22c of FIG. 1, "T3" 28c of FIG. 2) from its corresponding slot 32 allocated to the next-hop network device "B" 16b.

The processor circuit 42 of the next-hop network device "B" 16b in operation 82 also can insert, into the slot 32 that identified the next-hop network device "B" and its corresponding start time (e.g., 22b of FIG. 1, "T2" 28b of FIG. 2), the corresponding timing difference "ERR_B" 28b, and deterministically forward the source routed deterministic data packet 14c based on the deterministic start time specified for the next-hop network device "C" 16c (e.g., 22c of FIG. 1 or "T3" 28c of FIG. 2). Hence, the next-hop network device "B" 16b in operation 82 can transmit the source routed deterministic data packet 14c at event 86 at the transmission time "t_C".

The above-described operations can be repeated by each of the next-hop network devices along the deterministic source-route path 12, such that the next-hop network device "C" 16c can deterministically receive in operation 74 at event 86 the source routed deterministic data packet 14c, record in operation 76 the actual local time value for the reception time "t_C" at event 86, and determine the timing difference (e.g., "ERR_C=T3−t_C"). In response to the next-hop network device "C" 16c determining from the deterministic source-route header 18 in operation 80 that it is not the destination device of the source routed deterministic data packet 14, the next-hop network device "C" 16c in operation 82 can identify its corresponding next-hop network device "D" and its corresponding start time (e.g., 22d of FIG. 1, "T4" 28d of FIG. 2) from its corresponding slot 32 allocated to the next-hop network device "C" 16c. The next-hop network device "C" 16c in operation 82 can insert, into the slot 32 that identified the next-hop network device "C" and its corresponding start time (e.g., 22c of FIG. 1, "T3" 28c of FIG. 2), the corresponding timing difference "ERR_C" 28c, and deterministically forward the source routed deterministic data packet 14d at the deterministic start time specified for the next-hop network device "D" 16d (e.g., 22d of FIG. 1 or "T4" 28d of FIG. 2).

Hence, the next-hop network device "C" 16c in operation 82 can transmit the source routed deterministic data packet 14d to the next-hop network device "D" 16d at event 88 at the transmission time "t_D".

The above-described operations can be repeated by the next-hop network device "D" 16d, which can deterministically receive in operation 74 at event 88 the source routed deterministic data packet 14d, record in operation 76 the actual local time value for the reception time "t_D" at event 88, and determine the timing difference (e.g., "ERR_D=T4−t_D") in operation 78. The next-hop network device "D" 16d in operations 80 and 82 can identify its corresponding next-hop network device "E" and its corresponding start time (e.g., 22e of FIG. 1, "T5" 28e of FIG. 2) from its corresponding slot 32 allocated to the next-hop network device "D" 16d, and in operation 82 can insert, into the corresponding slot 32 the corresponding timing difference "ERR_D" 28d. The next-hop network device "D" can deterministically forward the source routed deterministic data packet 14e at the deterministic start time specified for the next-hop network device "E" 16e (e.g., 22e of FIG. 1 or "T5" 28e of FIG. 2). Hence, the next-hop network device "D" 16d in operation 82 can transmit the source routed deterministic data packet 14e to the next-hop network device "E" 16e at event 92 at the transmission time "t_E".

The destination network device "E" 16e in operation 74 can deterministically receive at event 92 the source routed deterministic data packet 14e, record in operation 76 the actual local time value for the reception time "t_E" at event 92, and determine the timing difference (e.g., "ERR_E=T5−t_E") in operation 78. In response to determining in operation 80 that it is the intended destination of the source routed deterministic data packet 14, the processor circuit 42 of the destination network device "E 16e in operation 94 can process the received source routed deterministic data packet 14 by stripping the IP headers and forwarding the payload to upper application layers, and generating a new management packet 96 to the PCE 20 that identifies the collected time differences 30a, 30b, 30c, 30d, and 30e. The destination network device "E" 16 can forward the source-route header containing the collected time differences along the source-route path for performance analysis by the PCE 20.

Hence, the PCE 20 can receive the management packet 96 comprising the collected time differences 30a, 30b, 30c, 30d, and 30e, to identify any performance issues in the deterministic data network 10 such as colliding data packets, overlapping deterministic timeslots, etc.

According to example embodiments, deterministic schedules can be allocated to a source network device, enabling the source network device to dynamically generate a deterministic source route path to a destination network device, without any programming of the deterministic schedules in any of the intermediate network devices or the destination network device. Hence, a source network device can transmit a deterministic data packet along a deterministic source route path on an ad hoc basis. The use of a deterministic source route header to specify the deterministic start time for each hop enables each intermediate network device to determine its deterministic transmission time solely from the deterministic source route header, with no required programming by the PCE; the deterministic source route header also enables the intermediate network device to add any error information related to differences between the deterministic start time specified in the deterministic source route header, and the actual reception time.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a network device in a deterministic data network from a management device, one or more deterministic schedules for reaching a destination network device along one or more deterministic paths in the deterministic data network, the deterministic data network requiring guaranteed delivery of a data packet to the destination network device within a bounded time, the one or more deterministic schedules providing the guaranteed delivery along the one or more deterministic paths within the bounded time;
generating, by the network device, a deterministic source-route header specifying specified hops for reaching the destination network device based on the one or more deterministic schedules allocated for the one or more deterministic paths, the deterministic source-route header specifying, for each specified hop, a corresponding deterministic start time for initiating transmission of a source routed deterministic packet by a corresponding network device specified in the corresponding specified hop;
inserting, into the source routed deterministic packet, the deterministic source-route header specifying for each specified hop the corresponding deterministic start time; and
transmitting into the deterministic data network to a next-hop network device specified as a next hop in the deterministic source-route header, by the network device, the source routed deterministic packet comprising the deterministic source-route header, for deterministic forwarding of the source routed deterministic packet to the destination network device, without prior installation of the one or more deterministic schedules in any network devices along the one or more deterministic paths between the network device and the destination network device.

2. The method of claim 1, wherein the deterministic start time identifies a time-triggered start time according to a time-triggered deterministic transmission protocol.

3. The method of claim 1, wherein the deterministic start time identifies a time slot in a time-slotted deterministic data network.

4. The method of claim 3, wherein the deterministic source-route header comprises, for each specified hop, a corresponding frequency channel for transmission of the corresponding source routed deterministic packet at the corresponding time slot.

5. The method of claim 1, wherein the generating includes determining a deterministic source-route path based on selecting an unallocated one of the deterministic schedules for reaching the destination network device via the corresponding deterministic path, and inserting at least a portion of the deterministic source-route path into the deterministic source-route header.

6. A method comprising:
deterministically receiving, by a network device in a deterministic data network, a source routed deterministic packet comprising a deterministic source-route header for reaching a destination network device in the deterministic data network via specified unused hops, the deterministic data network requiring guaranteed delivery of the source routed deterministic packet to the destination network device within a bounded time, the deterministic source-route header providing the guaranteed delivery within the bounded time, the deterministic source-route header specifying, for each specified unused hop, a corresponding deterministic start time for initiating transmission of the source routed deterministic packet by a corresponding network device specified in the corresponding specified unused hop; and
deterministically transmitting, by the network device, the source routed deterministic packet at the corresponding deterministic start time specified for the network device in the deterministic source-route header to a next-hop network device specified as a next hop in the deterministic source-route header, for deterministic forwarding of the source routed deterministic packet toward the destination network device, without prior installation of any deterministic schedule in the network device, the next-hop network device, or any network devices along the specified unused hops between the network device and the destination network device.

7. The method of claim 6, further comprising:
determining, by the network device, a timing difference between the corresponding deterministic start time, specified in the deterministic source-route header for reception of the deterministic packet by the network device, and an actual time value of the network device receiving of the source routed deterministic packet; and
inserting the timing difference into the deterministic source-route header at a corresponding slot allocated for the network device, causing a management device to compare the timing difference with the corresponding deterministic start time relative to a prescribed deterministic schedule allocated for deterministic forwarding of the deterministic packet.

8. The method of claim 6, wherein the deterministic start time identifies one of a time-triggered start time according to a time-triggered deterministic transmission protocol, or a timeslot in a time-slotted deterministic data network.

9. An apparatus comprising:
a device interface circuit configured for receiving, in a deterministic data network from a management device, one or more deterministic schedules for reaching a destination network device along one or more deterministic paths in the deterministic data network, the deterministic data network requiring guaranteed delivery of a data packet to the destination network device within a bounded time, the one or more deterministic schedules providing the guaranteed delivery along the one or more deterministic paths within the bounded time; and
a processor circuit configured for generating a deterministic source-route header specifying specified hops for reaching the destination network device based on the one or more deterministic schedules allocated for the one or more deterministic paths, the deterministic source-route header specifying, for each specified hop, a corresponding deterministic start time for initiating transmission of a source routed deterministic packet by a corresponding network device specified in the corresponding specified hop;
the processor circuit further configured for inserting, into the source routed deterministic packet, the deterministic source-route header specifying for each specified hop the corresponding deterministic start time;
the processor circuit further configured for causing the device interface circuit to transmit, into the deterministic data network, to a next-hop network device specified as a next hop in the deterministic source-route header, the source routed deterministic packet comprising the deterministic source-route header for deterministic forwarding of the source routed deterministic packet to the destination network device, without prior installation of the one or more deterministic schedules in any network devices along the one or more deterministic paths between the apparatus and the destination network device.

10. The apparatus of claim 9, wherein the processor circuit is configured for identifying the deterministic start time as a time-triggered start time according to a time-triggered deterministic transmission protocol.

11. The apparatus of claim 9, wherein the processor circuit is configured for identifying the deterministic start time as a time slot in a time-slotted deterministic data network.

12. The apparatus of claim 11, wherein the processor circuit is configured for inserting into the deterministic source-route header, for each specified hop, a corresponding frequency channel for transmission of the corresponding source routed deterministic packet at the corresponding time slot.

13. The apparatus of claim 9, wherein the processor circuit is configured for determining a deterministic source-route path based on selecting an unallocated one of the deterministic schedules for reaching the destination network device via the corresponding deterministic path, and inserting at least a portion of the deterministic source-route path into the deterministic source-route header.

14. An apparatus comprising:
a device interface circuit configured for deterministically receiving, in a deterministic data network, a source routed deterministic packet comprising a deterministic source-route header for reaching a destination network device in the deterministic data network via specified unused hops, the deterministic data network requiring guaranteed delivery of the source routed deterministic packet to the destination network device within a bounded time, the deterministic source-route header providing the guaranteed delivery within the bounded time, the deterministic source-route header specifying, for each specified unused hop, a corresponding deterministic start time for initiating transmission of the source routed deterministic packet by a corresponding network device specified in the corresponding specified unused hop; and
a processor circuit configured for causing the device interface circuit to deterministically transmit the source routed deterministic packet at the corresponding deterministic start time specified for the apparatus in the deterministic source-route header to a next-hop network device specified as a next hop in the deterministic source-route header, for deterministic forwarding of the source routed deterministic packet toward the destination network device, without prior installation of any deterministic schedule in the apparatus, the next-hop network device, or any network devices along the specified unused hops between the network device and the destination network device.

15. The apparatus of claim 14, wherein the processor circuit is configured for:
determining a timing difference between the corresponding deterministic start time, specified in the deterministic source-route header for reception of the deterministic packet by the apparatus, and an actual time value of the apparatus receiving of the source routed deterministic packet; and
inserting the timing difference into the deterministic source-route header at a corresponding slot allocated for the apparatus, causing a management device to compare the timing difference with the corresponding deterministic start time relative to a prescribed deterministic schedule allocated for deterministic forwarding of the deterministic packet.

16. The apparatus of claim 14, wherein the deterministic start time identifies one of a time-triggered start time according to a time-triggered deterministic transmission protocol, or a timeslot in a time-slotted deterministic data network.

17. One or more non-transitory tangible media encoded with logic for execution by a machine and when executed by the machine operable for:
receiving, by the machine implemented as a network device in a deterministic data network from a management device, one or more deterministic schedules for reaching a destination network device along one or more deterministic paths in the deterministic data network, the deterministic data network requiring guaranteed delivery of a data packet to the destination network device within a bounded time, the one or more deterministic schedules providing the guaranteed delivery along the one or more deterministic paths within the bounded time;
generating, by the network device, a deterministic source-route header specifying specified hops for reaching the destination network device based on the one or more deterministic schedules allocated for the one or more deterministic paths, the deterministic source-route header specifying, for each specified hop, a corresponding deterministic start time for initiating transmission of a source routed deterministic packet by a corresponding network device specified in the corresponding specified hop;

inserting, into the source routed deterministic packet, the deterministic source-route header specifying for each specified hop the corresponding deterministic start time; and transmitting into the deterministic data network to a next-hop network device specified as a next hop in the deterministic source-route header, by the network device, the source routed deterministic packet comprising the deterministic source-route header for deterministic forwarding of the source routed deterministic packet to the destination network device, without prior installation of the one or more deterministic schedules in any network devices along the one or more deterministic paths between the network device and the destination network device.

18. The one or more non-transitory tangible media of claim 17, wherein the deterministic start time identifies one of:
   a time-triggered start time according to a time-triggered deterministic transmission protocol; or
   a time slot in a time-slotted deterministic data network and a corresponding frequency channel for transmission of the corresponding source routed deterministic packet at the corresponding time slot.

19. One or more non-transitory tangible media encoded with logic for execution by a machine and when executed by the machine operable for:
   deterministically receiving, by the machine implemented as a network device in a deterministic data network, a source routed deterministic packet comprising a deterministic source-route header for reaching a destination network device in the deterministic data network via specified unused hops, the deterministic data network requiring guaranteed delivery of the source routed deterministic packet to the destination network device within a bounded time, the deterministic source-route header providing the guaranteed delivery within the bounded time, the deterministic source-route header specifying, for each specified unused hop, a corresponding deterministic start time for initiating transmission of the source routed deterministic packet by a corresponding network device specified in the corresponding specified unused hop; and
   deterministically transmitting, by the network device, the source routed deterministic packet at the corresponding deterministic start time specified for the network device in the deterministic source-route header to a next-hop network device specified as a next hop in the deterministic source-route header, for deterministic forwarding of the source routed deterministic packet toward the destination network device, without prior installation of any deterministic schedule in the network device, the next-hop network device, or any network devices along the specified unused hops between the network device and the destination network device.

20. The one or more non-transitory tangible media of claim 19, further operable for:
   determining, by the network device, a timing difference between the corresponding deterministic start time, specified in the deterministic source-route header for reception of the deterministic packet by the network device, and an actual time value of the network device receiving of the source routed deterministic packet; and
   inserting the timing difference into the deterministic source-route header at a corresponding slot allocated for the network device, causing a management device to compare the timing difference with the corresponding deterministic start time relative to a prescribed deterministic schedule allocated for deterministic forwarding of the deterministic packet.

* * * * *